*M. T. Maury,*
*Cotton Bale Tie.*
No. 64,018. Patented Apr. 23, 1867.
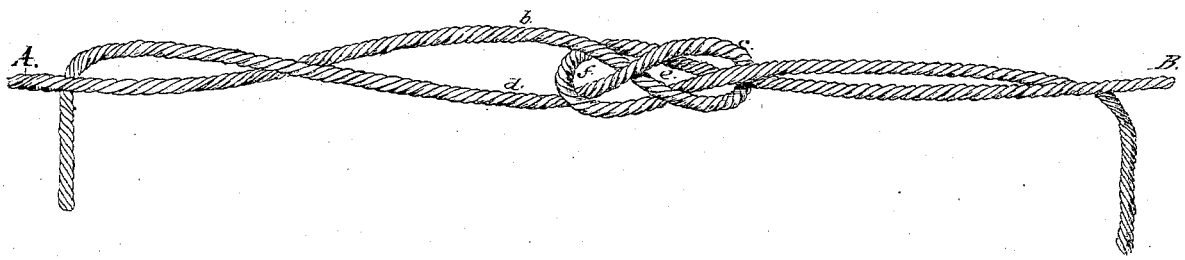
Witnesses:
Wm. A. Jordan
Rufus R. Rhodes
Inventor.
Matthew F. Maury

United States Patent Office

MATTHEW F. MAURY, OF LIVERPOOL, GREAT BRITAIN.

Letters Patent No. 64,018, dated April 23, 1867.

IMPROVEMENT IN FASTENING OF WIRE OR WIRE ROPE TOGETHER.

*The Schedule referred to in these Letters Patent and making part of the same.*

TO ALL WHOM IT MAY CONCERN:

Be it known that I, MATTHEW F. MAURY, of the city of Liverpool, in the Kingdom of Great Britain, have invented a new, useful, and improved Method of Fastening the Ends of Iron Wire or Wire Rope Together, when the same is used for baling cotton, wool, moss, or other like substance; and I do hereby declare the following to be a full, clear, and exact description of the same, reference being had to the annexed drawing, making part of this specification.

The superiority of iron bands over rope for the purpose of baling cotton has become so manifest within the last few years that the latter is rapidly going out of use; but hitherto, in consequence of the difficulty in tying the ends of wire and wire rope securely together, broad hoops or bands, with expensive buckles or ties to connect the ends thereof, have been preferred to wire or wire rope. The universal plan, in fact, that has hitherto been practised in fastening the ends of wire together, has been to simply twist the same. This plan is objectionable on two distinct grounds. In the first place the wire is greatly weakened by being thus twisted, and is nearly certain to break whenever the bale is subjected to a sudden jar or concussion; and, in the second place, the ends, when thus twisted together, become so inflexible that they project beyond the surface of the bale, and hence are continually catching upon other objects to the injury of the same, until they are finally broken off by contact with some object whose resistance is greater than their strength. In either case the effect is the same, the bale is unbanded. Notwithstanding that these difficulties have prevented the use of wire and wire rope in lieu of the ordinary band iron, it has been long known that, in almost every respect, wire presented superiorities over bands, which were sure ultimately to cause it to supersede them. It is relatively far stronger than band iron, and cheaper; and the injury to the cotton from oxidation is reduced to an extent that is in exact proportion to the diminished width of the wire as compared with the bands.

My invention looks to the substitution of wire and wire rope in lieu of bands, and it presents a method of fastening which the dullest understanding will at once comprehend, and which yet establishes a secure fastening without weakening the wire, or leaving the ends of the same in an exposed condition. My invention, therefore, overcomes the difficulties in the way of a general substitution of wire and wire rope for bands or hoops; and, referring to the drawings, it will be seen that it is of a very simple character. I fold one end of the wire in the manner that is shown by the end A at $b\ c\ d$. The wire being then put around the bale, the other end B is passed through the loops $e$ and $f$, and around the first end near $d$, and back again through loop $e$, as shown clearly on the drawings. No amount of tension can jam this tie, and hence, when the bale is compressed for transportation, there is no difficulty in shortening the wire so as to accommodate it to the reduced size of the bale. Nor can the ends of the wire ever catch upon other objects. Passed under that portion which is subjected to strain, they lie close upon the bale, being, in fact, to some extent, embedded in it, and protected by the bulging cotton on either side of it from all danger of this kind.

What I claim as my invention, and desire to secure by Letters Patent, is—

The tie herein described and shown upon the drawings, when the same is used to connect the ends of wire or wire rope that is employed in baling cotton, or other like substances, in the manner set forth.

MATTHEW F. MAURY.

Witnesses:
WM. A. JORDAN,
RUFUS R. RHODES.